United States Patent

[11] 3,565,401

| [72] | Inventor | Carlos W. Green<br>4601 N. 47th Drive, Phoenix, Ariz. 85031 |
|------|----------|--------|
| [21] | Appl. No. | 755,896 |
| [22] | Filed | Aug. 28, 1968 |
| [45] | Patented | Feb. 23, 1971 |

[54] ELECTRICAL GROUNDING DEVICE
10 Claims, 5 Drawing Figs.

| [52] | U.S. Cl. | 254/134.3 |
|------|----------|-----------|
| [51] | Int. Cl. | E21c 29/16 |
| [50] | Field of Search | 254/134.3, 190; 174/5, 5.2, 6 |

[56] References Cited
UNITED STATES PATENTS
2,786,092  3/1957  Gage............................ 254/134.3X Primary Examiner—Andrew R. Juhasz
Assistant Examiner—David R. Melton
Attorney—James E. Marquardt ABSTRACT: An apparatus for grounding electrical conductor during stringing operations. The apparatus comprises a spring loaded grounding roller secured to a stringing block. Spring loading of the grounding roller toward the stringing sheave mounted in the block maintains electrical contact between the grounding roller and the conductor.

INVENTOR.
CARLOS W. GREEN
BY
*James E Marquardt*
ATTORNEY

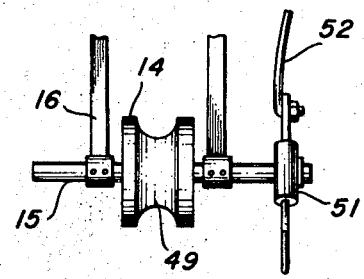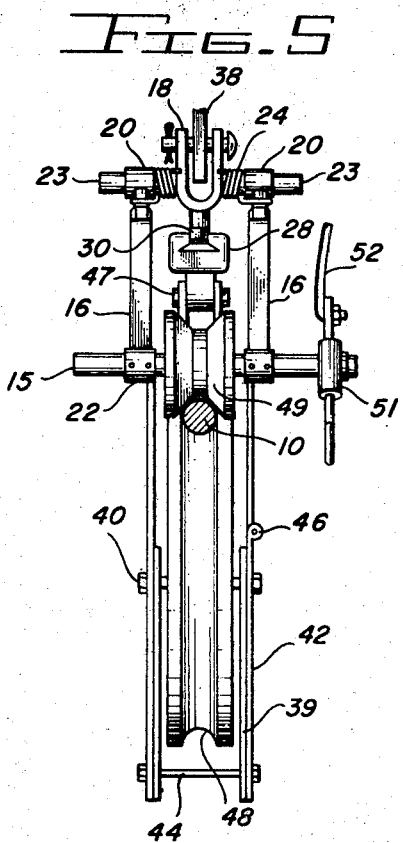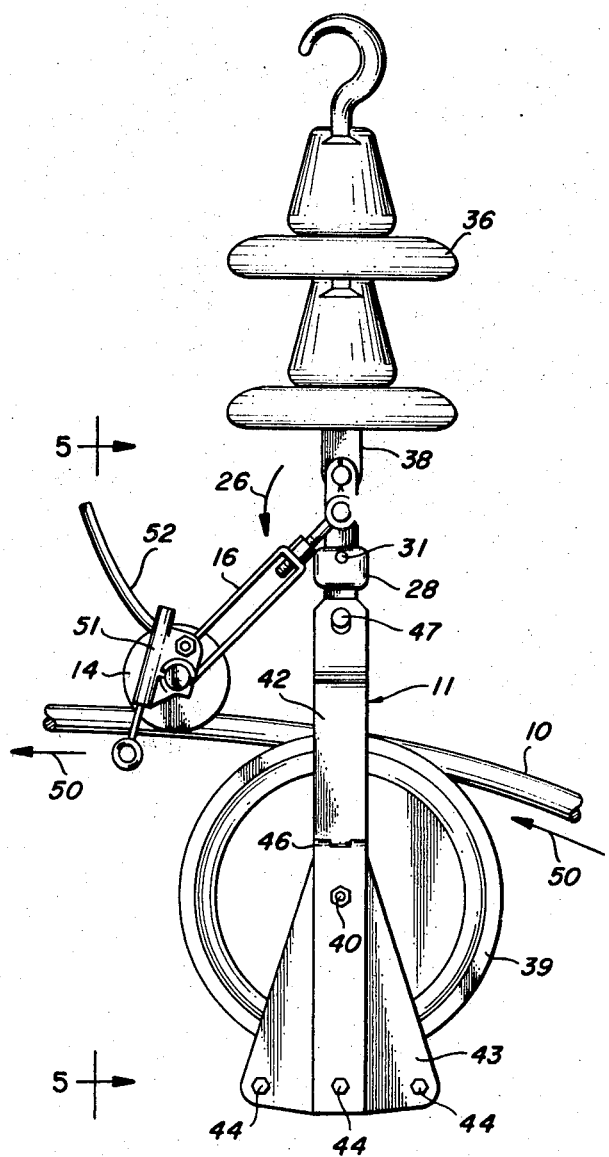
INVENTOR.
CARLOS W. GREEN
BY
ATTORNEY

ELECTRICAL GROUNDING DEVICE

ELECTRICAL GROUNDING DEVICE

My invention relates to an electrical-grounding device, and more particularly to a grounding device for use in conjunction with a stringing block employed in stringing electrical cable or wire.

When electrical cable or wire, generally referred to as conductor, is strung, it is necessary to protect workmen by grounding the conductor. Frequently, it is necessary that the conductor be strung parallel to or across other conductors which are carrying electrical current. Under such conditions, tree branches may fall on the current carrying or "hot" wire and on the conductor being strung, thereby causing the conductor being strung to become hot with consequent hazard to the workmen stringing the conductor. Similarly, a hot wire may come in direct contact with the conductor being strung. Another hazard sometimes encountered when great lengths of conductor are being strung is that of induced current. Even though no direct physical connection is made between hot and strung conductors, induction may cause the strung conductor to become hot.

In the past, various attempts have been made to ground conductors during stringing operations. An early method was simply to provide a conducting stringing sheave and ground the block in which the sheave turned. This proved unacceptable for several reasons. Steel sheaves tend to tear up the conductor, particularly at splices necessary when great lengths are strung. Further, lubricant on the sheave axle tended to impair conductivity, thereby rendering this method unreliable.

Because of the tendency of metal sheaves to tear up or strip conductor cable, many stringing blocks are now employed having rubber or other soft material lining the peripheral groove of the stringing sheave. Conductivity is thus drastically reduced with little or no protection afforded workmen engaged in the stringing operation.

With the advent of lined stringing sheaves, it is necessary to provide a separate grounding means. Devices proposed heretofore have been unsatisfactory because of their tendency to reject splices and because of the difficulty of adding or removing them at points on the conductor other than the ends.

It is an object of my invention to provide a grounding device which is reliable.

It is another object of my invention to provide a grounding device which is simple, lightweight and inexpensive.

It is a further object of my invention to provide a grounding device which may be added or removed from any point along the length of the conductor as needed.

Other objects and advantages of my invention will become apparent in the course of the specification and claims when taken in view of the accompanying drawings in which:

FIG. 3 is a partial plan view illustrating another useful embodiment of my grounding roller.

FIG. 4 is a side view of my invention as it appears in use with a typical stringing block; and FIG. 5 is a view taken along lines 5–5 of FIG. 4 further illustrating my invention as it appears in use.

Figure 1:
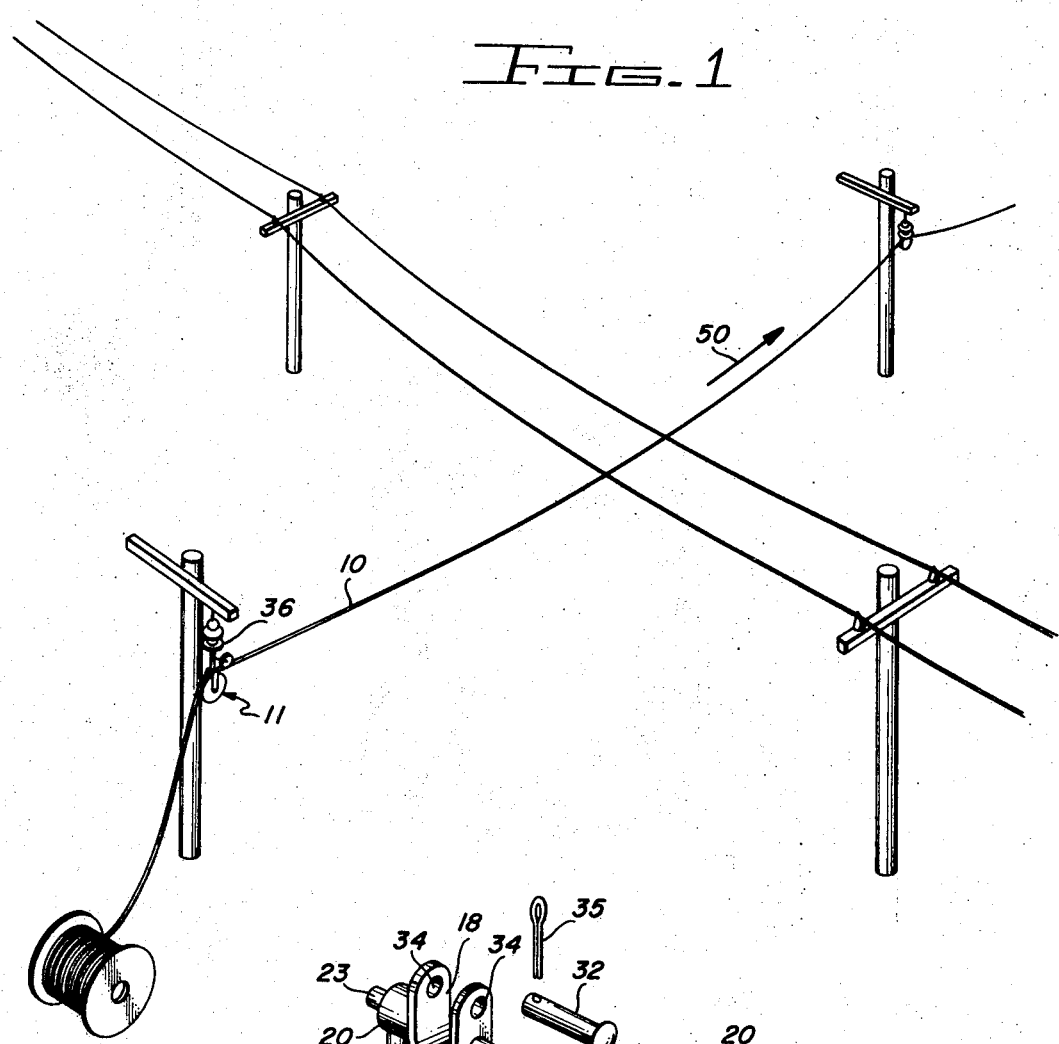
FIG. 1 is a pictorial representation of my invention in use under a typical problematical situation.
Figure 2:
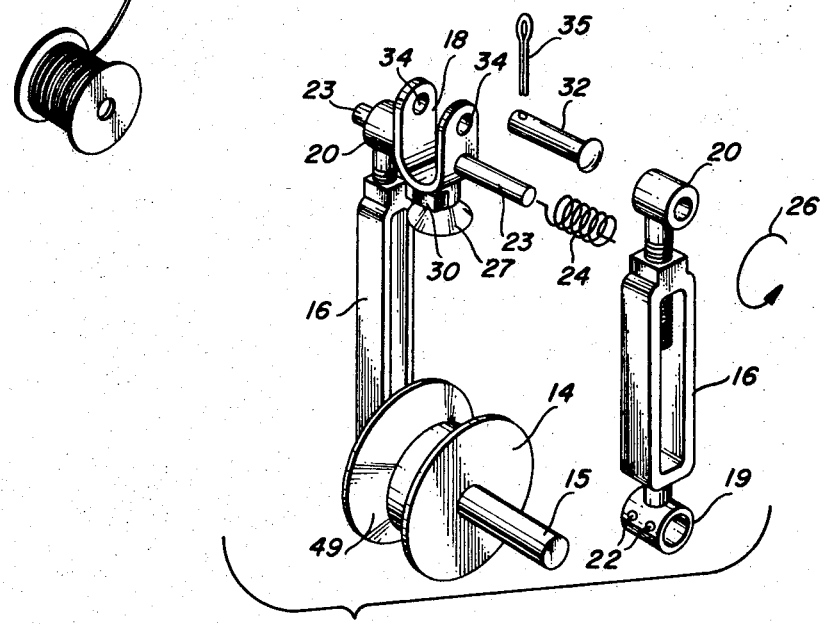
FIG. 2 is an exploded isometric view of a preferred embodiment of my grounding roller and its associated mounting parts.

In the drawings, I will refer to the conductor by the general reference numeral 10 and to the stringing block by the general reference numeral 11.

My grounding device has a grounding roller 14 containing an axial bore. An axle 15 extends through the bore of the roller 14. A pair of arms 16 connect axle 15 with a mounting bracket 18. Each arm 16 has lower cuff 19 and an upper cuff 20. Each of said cuffs has a bore, said bores on each arm having parallel axes. Lower cuffs 19 engage around axle 15. In the embodiment shown, lower cuffs 19 are secured to axle 15 by set screws 22. Spacing of the cuffs 19 from the roller 14 is preferably sufficient to permit the roller 14 to turn about the axle 15 but close enough to avoid excessive side travel by the roller 14 along the axle 15.

Mounting bracket 18 is generally U-shaped. Coaxial cylindrical fingers 23 extend outwardly from the sides of said mounting bracket. In assembly, upper cuffs 20 of the arms 16 rotatably engage over the fingers 23 of the mounting bracket 18. A circular spring 24 engages around each finger 23, contacting the mounting bracket 18 and arms 16 so as to spring load the arms toward the stringing block 11 in the direction shown by the arrows 26.

In the embodiment shown, arms 16 are adjustable in length to provide adaptability for different sizes of stringing blocks and their associated stringing sheaves. Arms 16 comprise a turnbuckle rigidly secured to lower cuff 19 and threadedly engaging a shaft secured to upper cuff 20. In this manner, the length of arms 16 may be adjusted by rotation of the turnbuckle. Of course, the threaded shaft may be secured to the lower cuff and the turnbuckle secured to the upper cuff, if desired.

Mounting bracket 18 has a downwardly extending knob 27 to engage in the hanging clamp 28 of a stringing block 11. In the event a type of stringing block other than the one shown is employed, the necessary adaptation can be made without departing from my invention. A lug 30 extending forwardly from knob 27 prevents said knob 27 from turning in clamp 28. A set screw 31 prevents disengagement of knob 27 from clamp 28.

A pin 32 engages through apertures 34 in the mounting bracket 18 and is secured as by a key 35. The pin 32 serves to support the combined apparatus from an insulating bell 36. Said insulating bell 36 has an eye 38 extending downwardly from its lower portion. In use, pin 32 engages through said eye 38 to support the grounding device with the stringing block 11. The insulating bell 36 may have any appropriate configuration and may be mounted in any convenient position. The embodiment shown is but one common application wherein the insulating bell is suspended from a tower or cross arm in a vertical manner.

In the embodiment shown, stringing block 11 comprises a stringing sheave 39 mounted on an axle 40 supported by side plates 42. Additional support is lent to the assembly by supplemental plates 43 which are secured to the side plates 42 as by welding. Supplemental plates 43 further serve to weight the assembly and prevent swaying and to maintain the assembly in its desired operating position. The assembly is held in place at the bottom by bolts 44. At the top of the stringing block 11, the clamp 28 is secured between the side plates as by welding. One of the side plates comprises an upper and lower portion hingedly joined together above the axle 40 by a hinge 46. A rotatable key 47 is rotatably secured to the other, unitary side plate and engages through an aperture in the upper portion of the hinged side plate. When in operation, as shown, the key 47 holds the upper hinged portion of the side plate in position. Turning the key 47 through an arc of 180° permits disengagement and outward opening of the upper hinged portion. Stringing sheave 39 has a peripheral groove 48 which may be of any appropriate configuration for the conductor and conditions of stringing and may be lined with rubber or other soft material to prevent stripping or unraveling the conductor. The groove should be of sufficient size to permit easy passage of splices or other variations in cross-sectional dimension of the conductor.

The roller 14 shown describes a wide peripheral groove 49. Configuration of the groove 49 may be U-shaped or arcuate as illustrated in FIG. 3, but preferably is that of a flat-bottomed V. This V-shaped configuration is highly advantageous since it provides a minimum of two points of electrical contact with the conductor 10. With smaller diameter conductors, three points of electrical contact are possible. I prefer to fabricate roller 14 of an aluminum alloy to reduce weight, but any electrical conducting material having adequate wear characteristics is appropriate. The width of circumferential groove 49 must be in excess of the conductor diameter. Preferably, sufficient excess width is provided to freely pass splices, sleeves, or other deviations from the normal conductor diameter.

In operation, conductor 10 passes through the stringing block 11, over the stringing sheave 39, and under the roller 14. Because of the spring loading of my grounding device 12, the roller 14 is maintained in constant electrical contact with the conductor 10. The shape and positioning of my grounding device permits passage of splices or other configurational variations in the conductor without stripping or undue wear. While I prefer to use my grounding device with the conductor moving in the direction shown by the arrows 50, the conductor is free to move in the opposite direction without adverse effects. The spring loading of the grounding roller 14 is toward the sheave 39 so that floating contact with the conductor 10 is maintained at all times.

When workmen are stringing conductor, the conductor may be threaded through the combined grounding device and stringing block previously secured to an insulator. Occasionally it is necessary to ground the conductor at a point or points intermediate the ends thereof. In such a situation, the key 47 is rotated to permit opening of the upper portion of side plate 42. With said upper portion opened, the conductor 10 is simply positioned in the groove 48 of stringing sheave 39 and the roller 14 positioned over the conductor in contact therewith. The side plate is then closed and the key 47 rotated to secure same in place. When the assembly is in position for use, grounding clamp 51 is secured to axle 15 to provide grounding connection through grounding wire 52. Grounding clamp 51 may be secured to axle 15 prior to positioning the conductor in the assembly or later, as desired. Usually, the pole or tower from which the conductor is to be suspended is grounded either by direct contact with the ground or by means of a grounding wire buried at its base and running up the side of the pole. Thus, ground connection may be completed by attaching grounding wire 52 to the tower itself or to the grounding wire buried at the base of the pole. If neither of these methods is appropriate, grounding wire 52 may be connected directly with a metal stake driven into the ground.

Various modifications may be made in my invention without departing from the spirit or scope thereof, and it is to be understood that my invention is to be limited only as defined by the appended claims.

I claim:

1. An electrical-grounding device for use in stringing electrical conductor comprising, in combination, a stringing block having a stringing sheave rotatably mounted therein on an axle, a grounding roller, said grounding roller supported by a pair of arms and mounted from the top of said stringing block and rotating about an axle parallel to the axle of the sheave in said stringing block, said arms detachably mounted from the top of said stringing block, said grounding roller having a peripheral groove and spring means urging said grounding roller toward said sheave.

2. The electrical-grounding device of claim 1 wherein said grounding roller is supported by a pair of arms, said arms having upper cuffs and lower cuffs, said upper cuffs rotatably engaging over fingers extending outwardly from a mounting bracket secured to the top of said stringing block and said lower cuffs engaging over the axle about which said grounding roller rotates.

3. The electrical-grounding device of claim 2 wherein said stringing block has a side plate openable above the axle about which said stringing sheave rotates.

4. The electrical-grounding device of claim 3 wherein each of said arms is adjustable in length and comprises an upper cuff, a lower cuff, and turnbuckle means, said lower cuffs secured to the axle about which said grounding roller rotates, said turnbuckle means threadedly engaging a shaft secured to one of said cuffs and said turnbuckle means rigidly secured to the other said cuff.

5. The electrical-grounding device of claim 4 wherein said spring means engages around said fingers extending outwardly from said mounting bracket between said mounting bracket and said arms, said spring means contacts said mounting bracket and said arms supporting said grounding roller, said openable side plate is openable by hinge means, said hinge means located above the axle about which said stringing sheave rotates and key means securing said openable side plate in position.

6. The electrical-grounding device of claim 5 wherein the lower cuffs of said arms are secured to said axle about which said grounding roller rotates by set screws, said mounting bracket is adapted to support the entire assembly from insulator means, said mounting bracket has a knob extending downwardly and engaging in a hanging clamp secured to the top of said stringing block, said mounting bracket having a lug associated with said knob to prevent turning of said knob in said hanging clamp, and wherein a grounding clamp is secured to the axle about which said grounding roller rotates, said grounding clamp communicating with a grounding wire.

7. The electrical-grounding device of claim 6 wherein said peripheral groove in said grounding roller has an arcuate configuration.

8. The electrical-grounding device of claim 6 wherein said peripheral groove in said grounding roller has a flat-bottomed V-shaped configuration.

9. The electrical-grounding device of claim 6 wherein said peripheral groove in said grounding roller has a width in excess of the diameter of the conductor to be strung.

10. The electrical-grounding device of claim 2 wherein said arms supporting said grounding roller are adjustable in length.